US008835863B2

(12) United States Patent
Shintani et al.

(10) Patent No.: US 8,835,863 B2
(45) Date of Patent: Sep. 16, 2014

(54) RADIATION DETECTOR

(71) Applicant: Panasonic Corporation, Kadoma (JP)

(72) Inventors: Yoichi Shintani, Osaka (JP); Ryuichi Murai, Osaka (JP); Mitsuhiro Murata, Hyogo (JP); Tomoyuki Maeda, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/024,203

(22) Filed: Sep. 11, 2013

(65) Prior Publication Data

US 2014/0084177 A1    Mar. 27, 2014

Related U.S. Application Data

(63) Continuation of application No. PCT/JP2012/006708, filed on Oct. 19, 2012.

(30) Foreign Application Priority Data

Mar. 7, 2012  (JP) .................. 2012-050040

(51) Int. Cl.
G01T 1/02       (2006.01)
G01T 1/29       (2006.01)
G01T 1/14       (2006.01)

(52) U.S. Cl.
CPC .............. G01T 1/02 (2013.01); G01T 1/2935 (2013.01); G01T 1/14 (2013.01)
USPC ....................................................... 250/374

(58) Field of Classification Search
CPC ........................................................ G01T 1/02
USPC ........................ 250/374, 361 R, 362, 385.1
See application file for complete search history.

(56) References Cited

U.S. PATENT DOCUMENTS 3,177,363 A *   4/1965  Scherbatskoy ................ 250/386
8,134,129 B2 *  3/2012  Tokanai et al. ........... 250/361 R
2006/0049362 A1  3/2006  Friedman et al.
2010/0265078 A1  10/2010  Friedman et al.

FOREIGN PATENT DOCUMENTS

| EP | 0 887 752 | 12/1998 |
| JP | 6-160535 | 6/1994 |
| JP | 7-169438 | 7/1995 |
| JP | 11-072569 | 3/1999 |
| JP | 2002-014171 | 1/2002 |

(Continued)

Primary Examiner — David Porta
Assistant Examiner — Faye Boosalis
(74) Attorney, Agent, or Firm — Hamre, Schumann, Mueller & Larson, P.C.

(57) ABSTRACT

The radiation detector includes: a housing defining an enclosed space filled with a radiation detection gas; first and second electrodes opposing each other across the enclosed space; insulating materials covering surfaces of the first and second electrodes facing the enclosed space; and a voltage source for applying a voltage to the first and second electrodes, whereby a radiation sensor is formed. The radiation sensor is configured so that: in a radiation detection period, a predetermined voltage is applied between the first and second electrodes, and an electric charge is accumulated on the insulating materials by ions and/or electrons generated by ionization of the gas by incident radiation; and in a radiation measurement time, an electric discharge is caused by applying a reverse bias voltage from that applied to the first and second electrodes in the radiation detection period, and a firing voltage is measured.

4 Claims, 7 Drawing Sheets

(56) References Cited

FOREIGN PATENT DOCUMENTS

| | | |
|---|---|---|
| JP | 2002-181948 | 6/2002 |
| JP | 2008-544249 | 12/2008 |
| JP | 2008-546999 | 12/2008 |
| JP | 2011-257667 | 12/2011 |
| WO | 2007/044068 | 4/2007 |

* cited by examiner

ND DETECTOR

TECHNICAL FIELD

The present application relates to a radiation detector, in particular, to a radiation detector that detects a radiation dose by collecting electrons and ions of gas ionized by radiation.

BACKGROUND ART

Radiation detectors that detect a radiation dose by collecting electrons and ions of gas ionized by radiation include two electrodes (cathode and anode) in a vessel filled with gas, and detect the radiation dose by applying a voltage between the two electrodes and collecting, at the electrodes, electrons and ions of gas ionized by radiation.

As such radiation detectors, an ionization chamber mode refers to one having a voltage-electrode configuration in which a voltage to be applied between a cathode and an anode is set within a range not amplifying a gas ionization signal generated by radiation, and a proportional counter mode refers to one having a voltage-electrode configuration in which an electron avalanche is caused by applying a high electric field in the vicinity of an anode so as to amplify a signal.

Conventional radiation detectors include one configured by arranging a thin linear anode at the center of a cylindrical sealed vessel that serves as a cathode, and filling the vessel with ionization gas such as an argon (Ar) gas mixed with an organic gas. In the vessel of the radiation detector, ionization gas is ionized by radiation, and generated electrons and ions move by an electric field applied between the cathode and the anode. At this time, an electron avalanche especially occurs in the vicinity of the anode, and the radiation is counted as a large pulse signal.

Further, there is a radiation detector that detects a radiation dose using different types of ionization gas depending on the energy of radiation to be measured, such as X-rays and γ-rays. For example, when detecting X-rays having low energy, gas of an element whose absorption coefficient is large and atomic number is large is used. Meanwhile, when detecting neutron rays, since neutron rays do not ionize gas, gas such as helium ($He_3$) or boron trifluoride ($BF_3$) that generates charged particles by nuclear reaction with neutron rays is used as the ionization gas. Further, there is a radiation detector that detects neutron rays by application of boron 10 ($B_{10}$), uranium 235 ($U_{235}$) or the like to the inside of a vessel that is used as a cathode, and converting the rays into charged particles in the vessel, thereby causing similar ionization effects (see Patent Documents 1, 2 and 3).

PRIOR ART DOCUMENTS

Patent Documents

Patent Document 1; JP 07 (1995)-169438 A
Patent Document 2; JP 2002-181948 A
Patent Document 3; JP 2002-14171 A

DISCLOSURE OF INVENTION

Problem to be Solved by the Invention

However, the above conventional radiation detectors have not shown a satisfactory ability in detecting low level radiation efficiently.

The present application solves such current problems, and its object is to provide a radiation detector capable of measuring low level radiation with a simple structure.

Means for Solving Problem

To solve such problems, a radiation detector disclosed in the present application is a radiation detector that includes: a housing defining an enclosed space filled with a radiation detection gas; first and second electrodes opposing each other across the enclosed space; insulating materials covering surfaces of the first and second electrodes facing the enclosed space; and a voltage source for applying a voltage to the first and second electrodes, whereby a radiation sensor is formed. The radiation sensor is configured so that; in a radiation detection period, a predetermined voltage is applied between the first and second electrodes, and an electric charge is accumulated on the insulating materials by ions and/or electrons generated by ionization of the gas by incident radiation; and in a radiation measurement time, an electric discharge is caused by applying a reverse bias voltage from that applied to the first and second electrodes in the radiation detection period, and a firing voltage is measured.

Effect of the Invention

According to the radiation detector disclosed in the present application, by utilizing the amount of electric charge accumulated on the insulator layer of the first sensor substrate and the insulator layer of the second sensor substrate in accordance with the radiation dose in the radiation detection period and measuring the voltage reduction at the start of the electric discharge, the radiation dose detected in the radiation detection period can be measured. Therefore, a radiation detector capable of measuring low level radiation with a simple structure can be realized.

DESCRIPTION OF THE INVENTION

Hereinafter, one embodiment of a radiation detector disclosed in the present application will be described with reference to the drawings.

Figure 1:
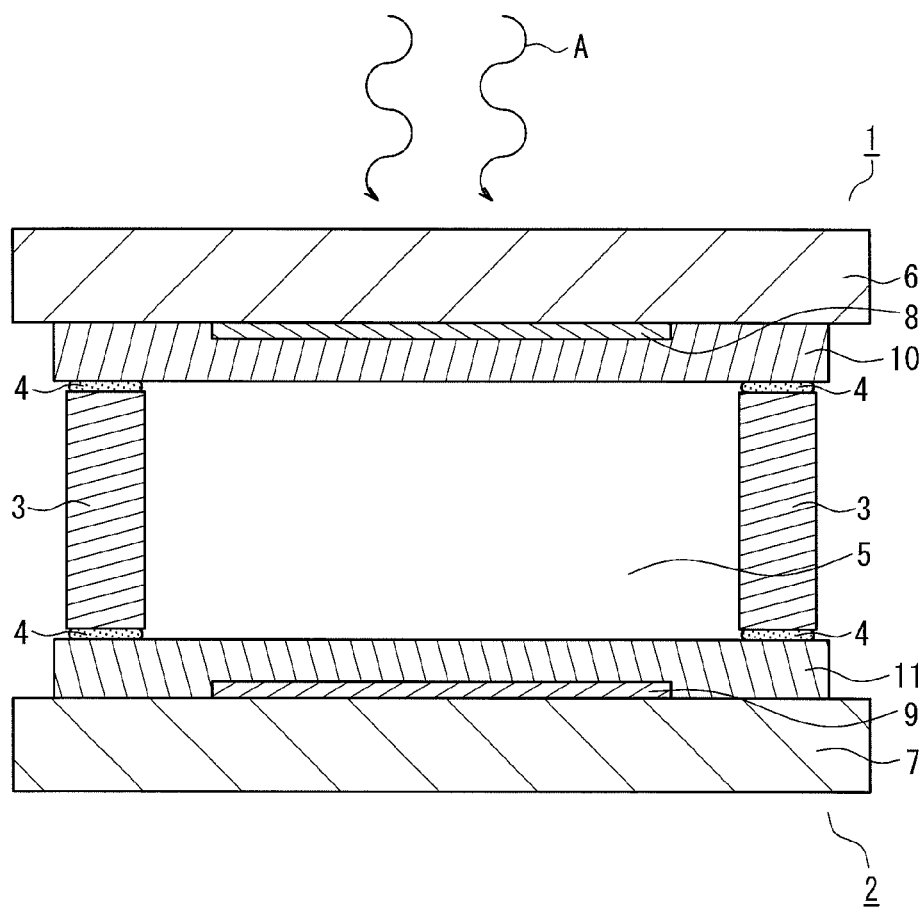
FIG. 1 is a cross-sectional view showing a radiation sensor of a radiation detector according to the present embodiment.

FIG. 1 is a cross-sectional view showing a schematic configuration of a radiation sensor part of a radiation detector according to the present embodiment.

As shown in FIG. 1, in the radiation sensor part of the radiation detector of the present embodiment, a first sensor substrate 1 and a second sensor substrate 2 are opposed to each other with a predetermined space therebetween by using a spacer 3 made of glass as a connection member. Further, sealing materials 4 seal gaps between the spacer 3 and the first and the second sensor substrates 1 and 2, thereby forming an enclosed space 5.

The enclosed space 5 is filled with one or more gases selected from He, Ne, Ar, Kr and Xe as a radiation detection gas that is ionized by radiation A, such as X-rays and γ-rays, that passes through the first sensor substrate 1 and the second sensor substrate 2. Thus, the radiation sensor is formed. Incidentally, as necessary, the gas to be ionized by radiation may contain an organic gas, etc.

In the first sensor substrate 1 and the second sensor substrate 2, electrodes 8 and 9 made of Ag are formed respectively on radiation-transmissive insulating substrates 6 and 7 made of soda glass, and insulator layers 10 and 11 made of a lead-free dielectric material are formed respectively on the insulating substrates 6 and 7 in such a manner as to cover the electrodes 8 and 9.

In the radiation detector of the present embodiment, as the lead-free dielectric material forming the insulator layers 10 and 11, a lead-free glass dielectric material may be used that includes bismuth oxide ($Bi_2O_3$), zinc oxide (ZnO) or boron oxide ($B_2O_3$) as a main component, and also includes silicon oxide ($SiO_2$), aluminium oxide ($Al_2O_3$), calcium oxide (CaO), strontium oxide (SrO), barium oxide (BaO), molybdenum oxide ($MoO_3$), tungsten oxide ($WO_3$), cerium oxide ($CeO_2$) or the like to be added to the main component.

More specifically, the dielectric material composed of these components is pulverized into powder having an average particle diameter of 0.5 μm to 2.5 μm using a wet jet mill or a ball mill, so as to prepare dielectric material powder. Then, the dielectric material powder and a binder component are mixed well using a triple roll, so as to prepare a dielectric layer paste for die coating or printing. Incidentally, as the binder component, ethyl cellulose or terpineol containing 1 wt % to 20 wt % of acrylic resin or butylcarbitol acetate can be used. Further, as necessary, in order to improve printability, the paste may contain a plasticizer such as dioctyl phthalate, dibutyl phthalate, triphenyl phosphate and tributyl phosphate, and also may contain a dispersant such as glycerol mono-olate, sorbitan sesquioleate, homogenol (product name, manufactured by Kao Corporation) and phosphoric esters of alkyl aryl groups.

The dielectric paste thus prepared is printed using a screen printing method or a die coating method, followed by drying, and sintering at 550° C. to 590° C., which is the temperature slightly higher than a softening point of the dielectric material. Thus, the insulator layers 10 and 11 are formed. The preferable thickness of the insulator layers 10 and 11 is about 40 μm.

Next, the principles of detecting a radiation dose by means of the radiation detector according to the present embodiment will be described using FIG. 2.

Figure 2A:
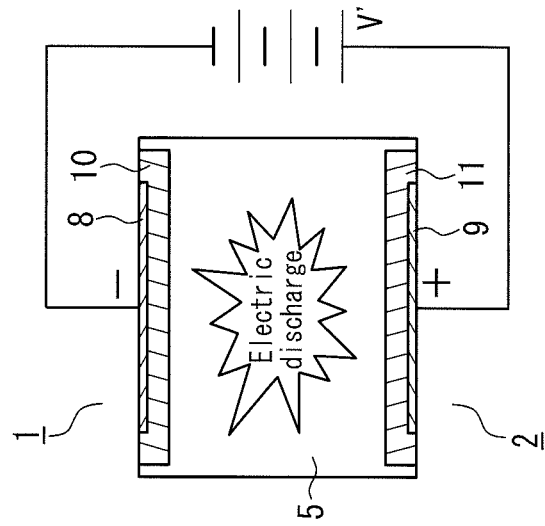
FIG. 2A-2C illustrates principles of the radiation detector according to the present embodiment.

First, as shown in FIG. 2A, a voltage V of several hundred volts that causes the electrode 8 of the first sensor substrate 1 to be positive and the electrode 9 of the second sensor substrate 2 to be negative is applied to the radiation sensor shown in FIG. 1. In this state, if radiation A enters the enclosed space 5, gas inside the enclosed space 5 of the radiation sensor is ionized and pairs of electrons (−) and ions (+) are generated.

Figure 2B:
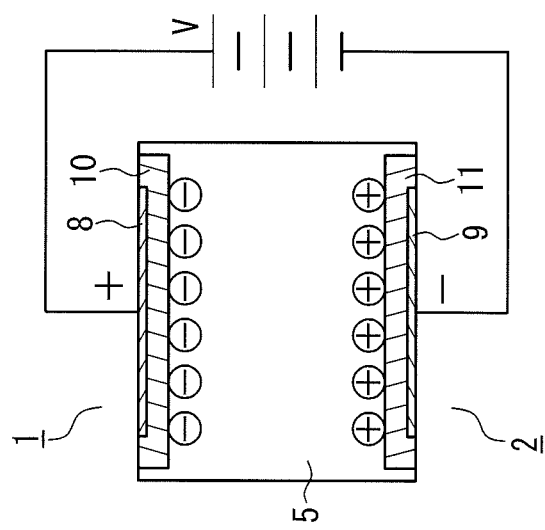

As shown in FIG. 2B, the electrons (negative electric charge) and ions (positive electric charge) thus generated are accumulated respectively on the insulator layer 10 of the first sensor substrate 1 and the insulator layer 11 of the second sensor substrate 2 by an electric field applied between the electrode 8 of the first sensor substrate 1 and the electrode 9 of the second sensor substrate 2 of the radiation sensor. At this time, the electric charges accumulate on the insulator layer 10 of the first sensor substrate 1 and the insulator layer 11 of the second sensor substrate 2, and a current does not flow.

The period shown in FIGS. 2A and 2B is a radiation detection period. The amount of electric charge to be accumulated on the insulator layer 10 of the first sensor substrate 1 and the insulator layer 11 of the second sensor substrate 2 varies depending on the radiation dose entering the enclosed space 5.

Figure 2C:
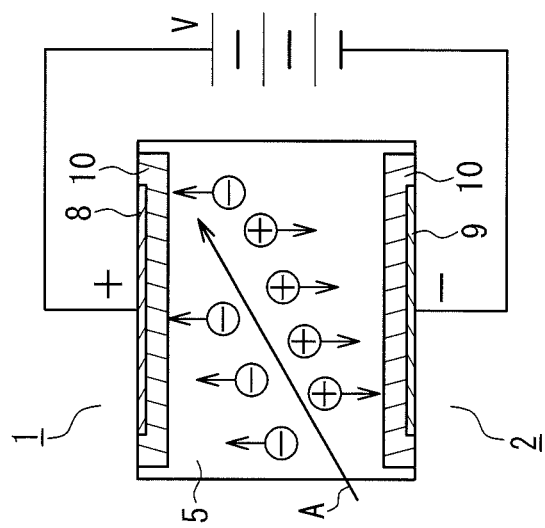

Next, in a radiation measurement time, when measuring the radiation dose detected, as shown in FIG. 2C, contrary to FIG. 2A, a reverse bias voltage V' of several hundred volts that causes the electrode 8 of the first sensor substrate 1 to be negative and the electrode 9 of the second sensor substrate 2 to be positive is applied, thereby causing an electric discharge between the first sensor substrate 1 and the second sensor substrate 2. At this time, in accordance with the amount of electric charge accumulated on the insulator layer 10 of the first sensor substrate 1 and the insulator layer 11 of the second sensor substrate 2, i.e., the radiation dose detected in the radiation detection period, the electric discharge starts at a lower voltage. The radiation dose detected in the radiation detection period can be measured by measuring the voltage reduction at the start of the electric discharge.

More specifically, when an accumulation period (i.e., the radiation detection period) is completed, a certain amount of electric charge that has a polarity opposite to the applied voltage and is proportional to the radiation dose is accumulated on surfaces of the insulator layers 10 and 11. In order to measure this electric charge, if a reverse bias voltage V' from that of the accumulation period is applied between the electrodes 8 and 9, an electric field generated by the applied voltage and the accumulated voltage (voltage by the accumulated electric charge) is applied to the gas space (enclosed space). In this case, since the electric discharge occurs at a voltage lower than the case without an accumulated voltage, the accumulated voltage can be measured by measuring this voltage difference.

For example, assuming that $V_0$ represents a voltage applied to the electrode 8 of the first sensor substrate 1 and the electrode 9 of the second sensor substrate 2 in the radiation measurement time, V represents an accumulated voltage, and Vf represents a firing voltage, the relationship can be expressed as: $Vf=V_0+V$. At this time, $V_0$ can be measured by setting the radiation measurement time as a radiation measurement period having a predetermined period, increasing the applied voltage $V_0$ stepwise or pulsatingly in the radiation measurement period, and observing the timing at which the electric discharge occurs by discharge emission, a current signal, or the like. Since Vf is a value determined by the structure of the radiation detector and the composition of gas, the accumulated voltage V can be obtained.

Further, since the accumulated voltage V satisfies the relationship of Q=CV, where C represents a capacitance of the insulator layers 10, 11 and Q represents an accumulated electric charge, the capacitance C can be calculated if the dielectric material forming the insulator layers 10 and 11, the thickness thereof, and the shape of electrodes are known. Thus, the accumulated electric charge Q proportional to the radiation dose can be obtained based on the calculated accumulated voltage V and the capacitance C.

As described above, the radiation detector according to the present embodiment includes the radiation sensor that is configured by filling a radiation detection gas into the enclosed space 5, which is formed by opposing the first sensor substrate 1 and the second sensor substrate 2 to each other with a predetermined space therebetween. The first sensor substrate 1 and the second sensor substrate 2 of the radiation sensor respectively are configured by forming a pair of the electrodes 8 and 9 on the radiation-transmissive insulating substrates 6 and 7 (not illustrated in FIG. 2) and forming the insulator layers 10 and 11 made of the dielectric material on the insulating substrates 6 and 7 in such a manner as to cover the electrodes 8 and 9. Further, by utilizing the phenomenon in the radiation detection period that the amount of electric charge to be accumulated on the insulator layer 10 of the first sensor substrate 1 and the insulator layer 11 of the second sensor substrate 2 varies depending on the radiation dose and measuring the voltage reduction at the start of the electric discharge in the radiation measurement period during which the electric discharge is caused between the first sensor substrate 1 and the second sensor substrate 2, the radiation dose detected in the radiation detection period can be measured.

Figure 3:
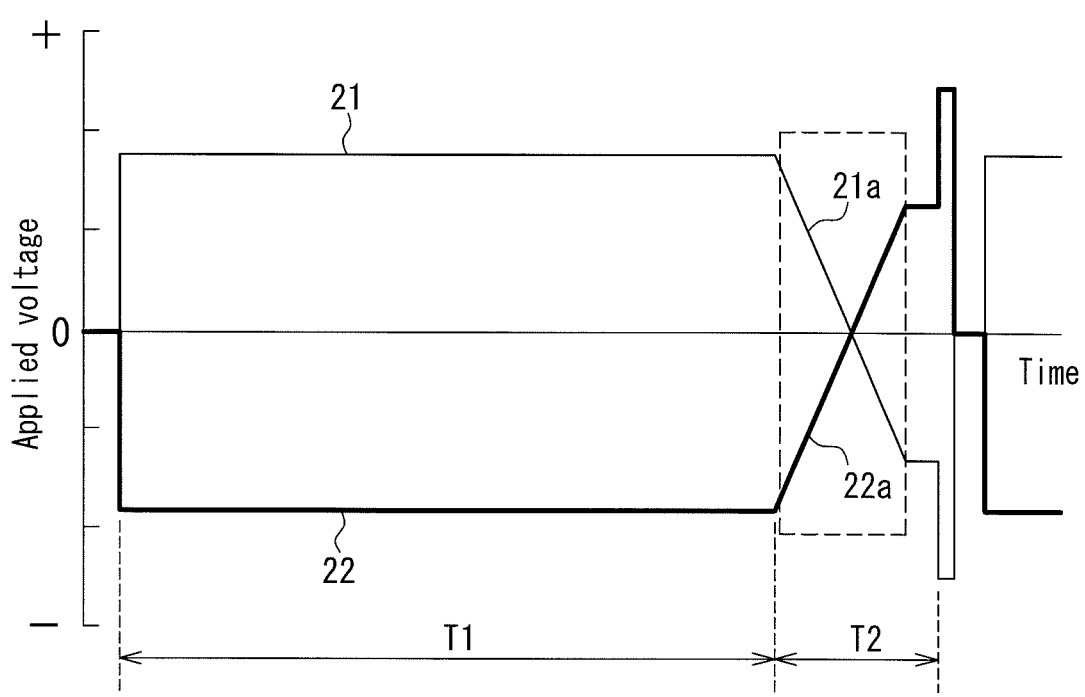
FIG. 3 is a voltage waveform diagram showing a relationship of an applied voltage in a radiation detection period and a radiation measurement period in the radiation detector according to the present embodiment.

FIG. 3 is a voltage waveform diagram showing an applied voltage in the radiation detection period and the radiation measurement period in the radiation detector according to the present embodiment.

In FIG. 3, a thin line 21 indicates a voltage waveform to be applied to the electrode 8 of the first sensor substrate 1 shown in FIG. 2A, and a thick line 22 indicates a voltage waveform to be applied to the electrode 9 of the second sensor substrate 2 that is an incident side of the radiation A. Further, T1 indicates the radiation detection period, and T2 indicates the radiation measurement period.

In FIG. 3, as enclosed with a dotted line, in the radiation measurement period T2, the radiation detector of the present embodiment is configured so that, when applying a reverse bias voltage from that of the radiation detection period T1 to the electrode 8 of the first sensor substrate 1 and the electrode 9 of the second sensor substrate 2, ramp voltage waveforms 21a and 22a in which the voltage changes gradually in this period are applied.

Specifically, in the radiation measurement period T2, regarding the voltage waveform 21 to be applied to the electrode 8 of the first sensor substrate 1, the ramp voltage waveform 21a in which the voltage decreases gradually to a negative potential is applied, and regarding the voltage waveform 22 to be applied to the electrode 9 of the second sensor substrate 2 that is the incident side of the radiation A, the ramp voltage waveform 22a in which the voltage increases gradually to a positive potential is applied.

Thus, in the radiation detector of the present embodiment, in the radiation measurement period T2, when applying a reverse bias voltage from that of the radiation detection period T1 to the electrode 8 of the first sensor substrate 1 and the electrode 9 of the second sensor substrate 2, the ramp voltage waveforms 21a and 22a in which the voltage changes gradually are applied. By doing so, as explained in FIG. 2, when measuring the accumulated radiation dose by measuring the voltage at which the electric discharge occurs, an easier and more sensitive measurement of the voltage becomes possible by controlling an inclination of the ramp voltage waveform, as compared with the case of applying a voltage having a steep pulse waveform. Further, since the ramp voltage waveform is a waveform in which the voltage value changes in accordance with an application time, the voltage at which the electric discharge occurs can be measured by conversion into the application time. Thus, a circuit configuration for digitally displaying detection results can be realized easily.

Figure 4:
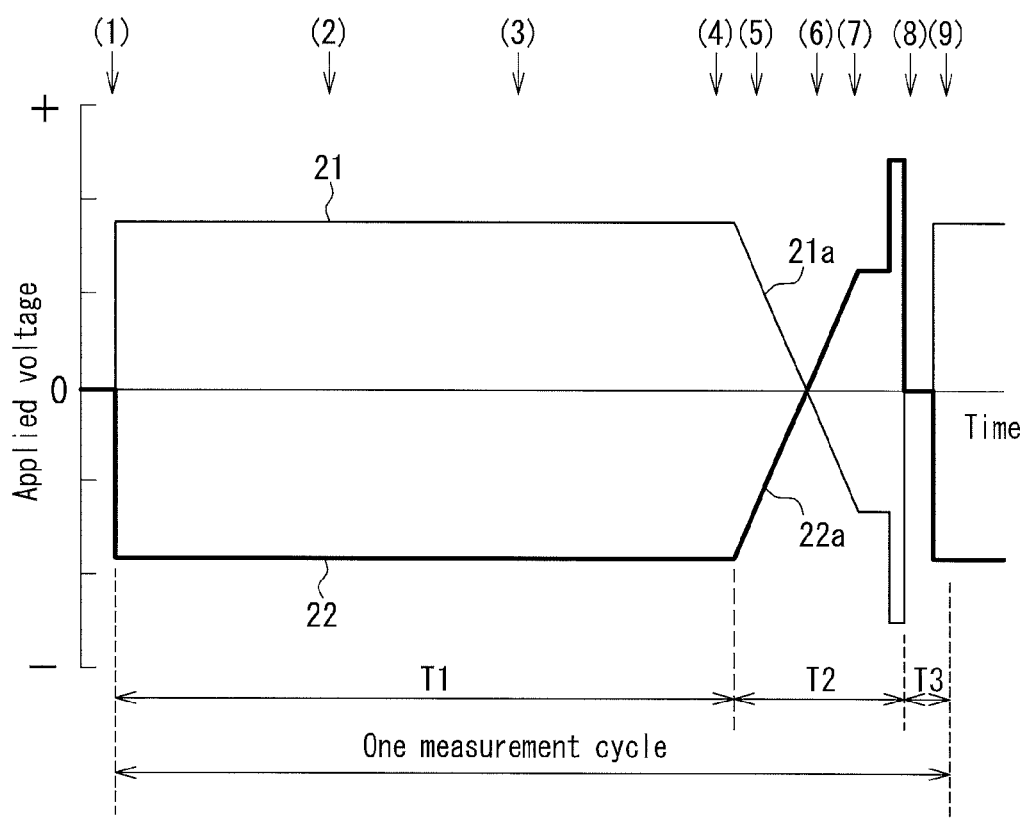
FIG. 4 is a voltage waveform diagram for illustrating a radiation measurement cycle in the radiation detector of the present embodiment.
Figure 5:
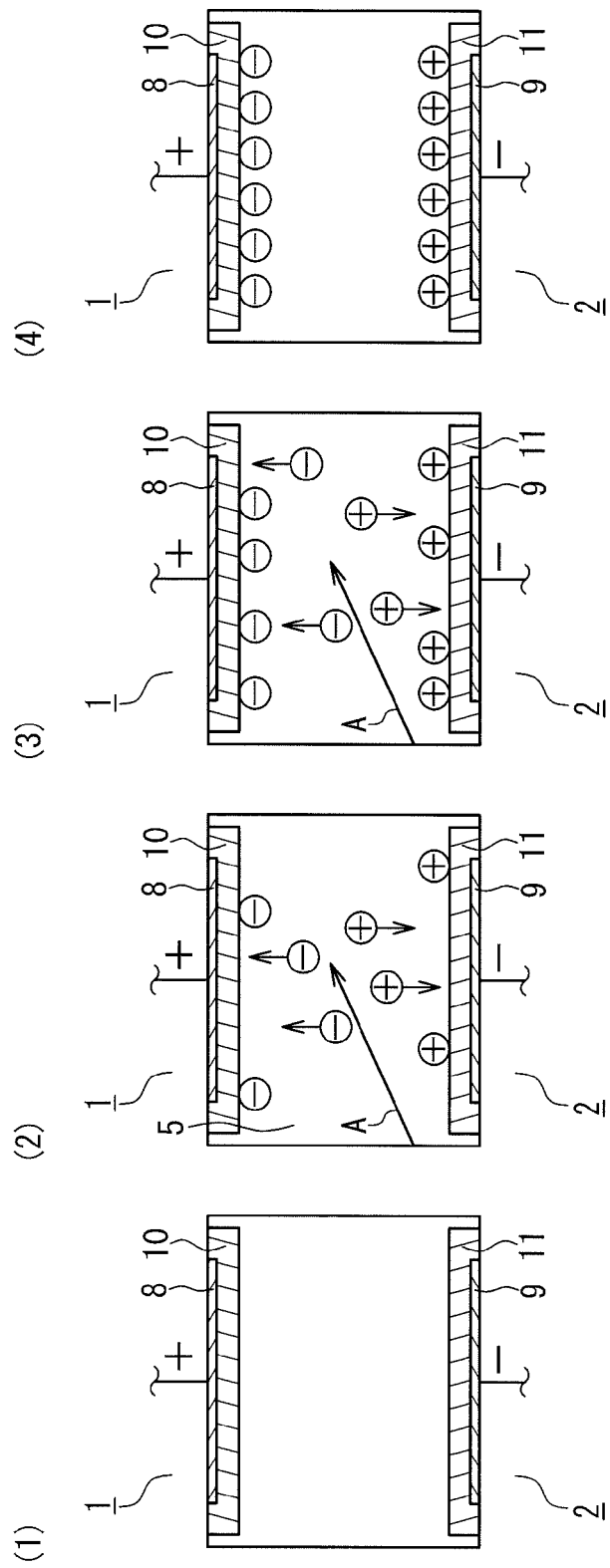
FIG. 5A-5D illustrates the radiation measurement cycle in the radiation detector of the present embodiment.
Figure 6:
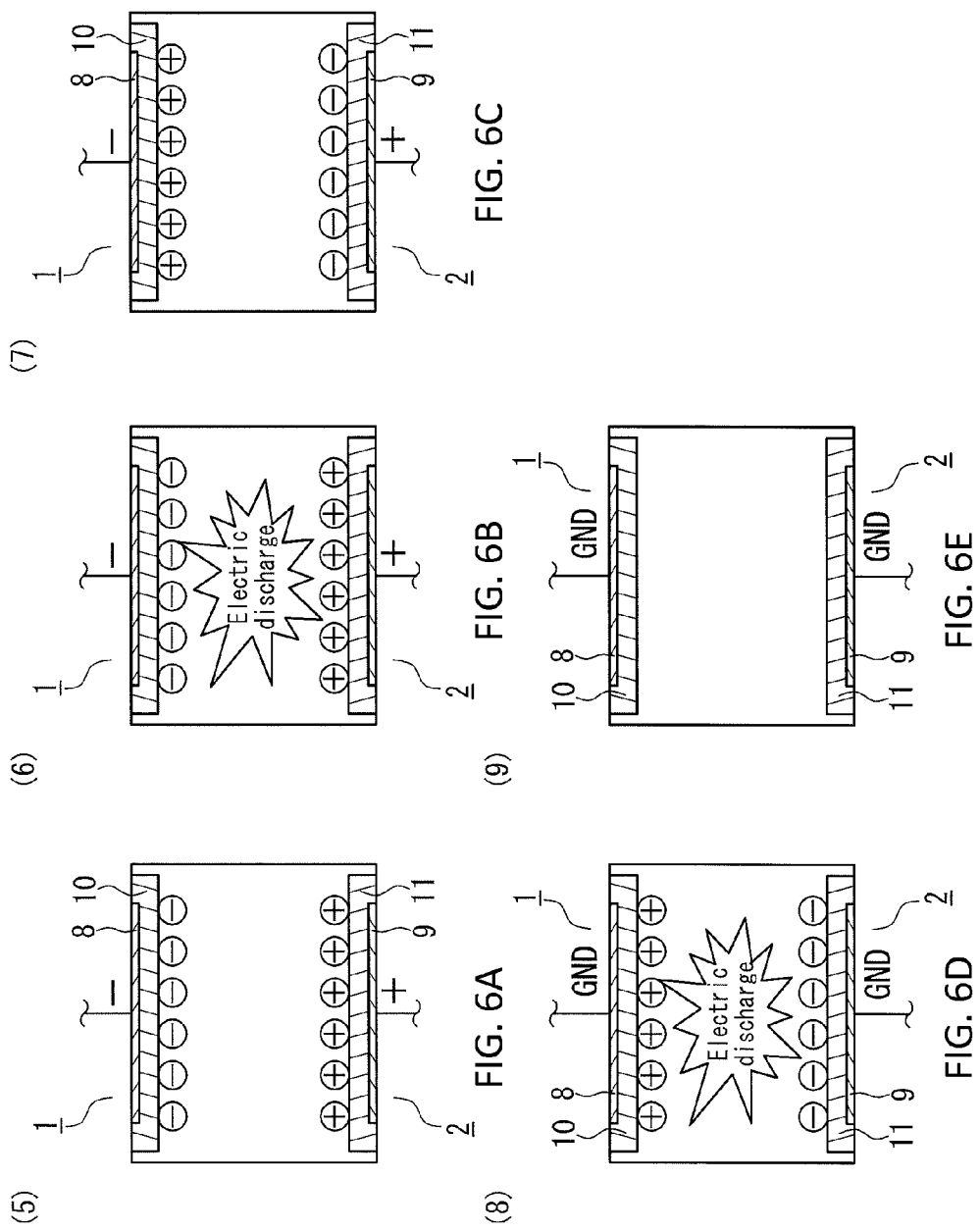
FIG. 6A-6E illustrates the radiation measurement cycle in the radiation detector of the present embodiment.

FIGS. 4, 5A-D and 6A-E are views for illustrating a measurement cycle of the radiation detector according to the present embodiment. FIG. 4 is a voltage waveform diagram showing an applied voltage in the measurement cycle of the radiation detector of the present embodiment. FIGS. 5A-D and 6A-E are schematic views for illustrating respective operations of the radiation detector in the measurement cycle shown in FIG. 4. (1) to (4) in FIG. 5A-D and (5) to (9) in FIG. 6A-E respectively show operations corresponding to states shown as (1) to (9) in FIG. 4.

As shown in FIG. 4, in the radiation detector according to the present embodiment, one cycle of the radiation measurement includes the radiation detection period T1, the radiation measurement period T2, and a reset period T3.

In an early detection period (1) of the radiation detection period T1, a voltage of several hundred volts that causes the electrode 8 of the first sensor substrate 1 to be positive and the electrode 9 of the second sensor substrate 2 to be negative is applied, but radiation does not enter the radiation sensor. Hence, this is a state where electric charges to be generated by radiation do not accumulate on the insulator layer 10 of the first sensor substrate 1 and the insulator layer 11 of the second sensor substrate 2.

In a middle detection period (2) of the radiation detection period T1, when radiation A enters, gas inside the enclosed space 5 of the radiation sensor is ionized and pairs of electrons and ions are generated. Due to an electric field applied between the electrode 8 of the first sensor substrate 1 and the electrode 9 of the second sensor substrate 2, a negative electric charge is accumulated gradually on the insulator layer 10 of the first sensor substrate 1 while a positive electric charge is accumulated gradually on the insulator layer 11 of the second sensor substrate 2. In a middle detection period (3) of the radiation detection period T1, if radiation A enters more, additional electric charges accumulate on the insulator layer 10 of the first sensor substrate 1 and the insulator layer 11 of the second sensor substrate 2.

In an end detection period (4) of the radiation detection period T1, electric charges, which are proportional to the entered radiation dose, accumulate on the insulator layer 10 of the first sensor substrate 1 and the insulator layer 11 of the second sensor substrate 2.

Next, in an early measurement period (5) of the radiation measurement period T2 during which the radiation dose detected is measured, a reverse bias voltage of several hundred volts that causes the electrode 8 of the first sensor substrate 1 to be negative and the electrode 9 of the second sensor substrate 2 to be positive is applied. At this time, as shown in FIG. 4, the ramp voltage waveforms 21a and 22a are applied.

Then, in a middle measurement period (6) of the radiation measurement period T2, an electric field generated by the applied voltage and the accumulated voltage (voltage by the accumulated electric charge) causes an electric discharge. As described above, in this case, since the electric discharge occurs at a voltage lower than the case without an accumulated voltage, the accumulated voltage in accordance with the radiation dose accumulated can be measured by measuring this voltage difference. In a later measurement period (7) of the radiation measurement period T2 after this measurement, due to the electric discharge that occurred in the middle measurement period (6), the positive electric charge is accumulated on the insulator layer 10 of the first sensor substrate 1 and the negative electric charge is accumulated on the insulator layer 11 of the second sensor substrate 2.

After completion of the radiation measurement period T2, the reset period T3 is provided so as to reset the electric charges in the radiation sensor to the initial state of the radiation detection period T1. In a reset time (8) of the reset period T3, by setting the electrode 8 of the first sensor substrate 1 and the electrode 9 of the second sensor substrate 2 at a ground potential, a slight electric discharge corresponding to the electric charges accumulated on the insulator layer 10 of the first sensor substrate 1 and the insulator layer 11 of the second sensor substrate 2 occurs. In an after-reset state (9), the electric charges accumulated on the insulator layer 10 of the first sensor substrate 1 and the insulator layer 11 of the second sensor substrate 2 of the radiation sensor are cancelled, thereby being reset to the initial state. In other words, in the reset period T3, the electric discharge for electric charge adjustment is caused so as to adjust the electric charges on the insulator layer 10 of the first sensor substrate 1 and the insulator layer 11 of the second sensor substrate 2 to the state before entrance of radiation.

The above operations are one cycle of the measurement cycle.

Here, in this measurement cycle, the radiation detection period T1 in one cycle during which radiation is measured is desired to be variable depending on the radiation dose. When the radiation dose is large, the accumulation period more preferably is set short so as to reduce the amount of electric charge to be accumulated. Meanwhile, when the radiation dose is low level, the accumulation period is set as long as possible so as to increase the radiation dose to be incident, thereby improving the sensitivity. The desired variable accumulation period is about several hundreds of μs to several hundreds of s, for example. Further, the desired radiation measurement period T2 is about several tens of μs to several ms.

Figure 7:
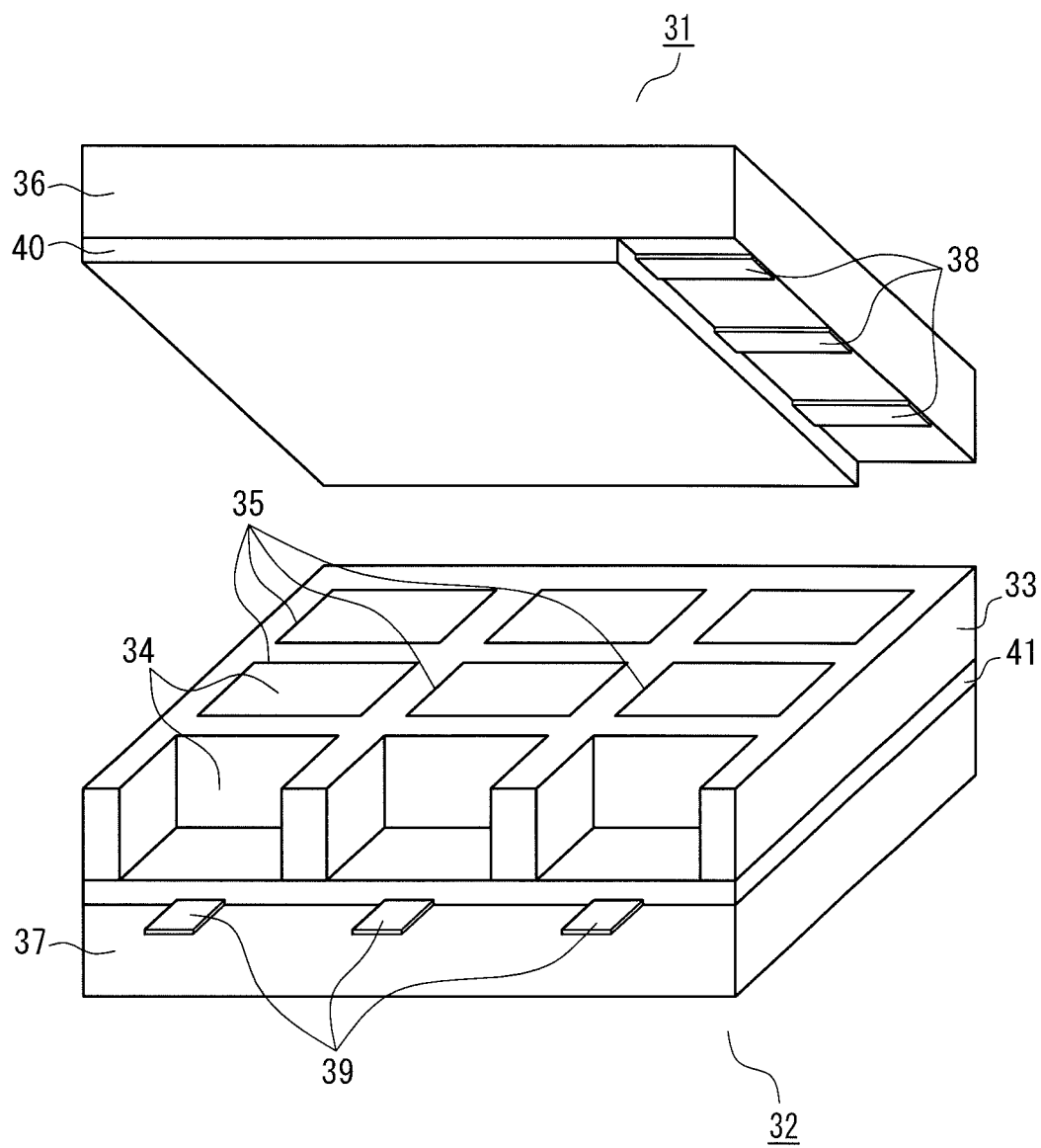
FIG. 7 is an exploded perspective view showing another configuration example of the radiation sensor of the radiation detector according to the present embodiment.

FIG. 7 is an exploded perspective view showing another configuration example of the sensor part in the radiation detector according to the present embodiment.

In the another configuration example of the radiation detector shown in FIG. 7, a plurality of sensor parts are arranged in a matrix (m row×n column) two-dimensionally.

As shown in FIG. 7, a first sensor substrate 31 and a second sensor substrate 32 are opposed to each other with a predetermined space therebetween using a parallel-grid shaped spacer 33 made of glass. Further, sealing materials (not shown) seal gaps between the spacer 33 and the first and the second sensor substrates 31 and 32, thereby forming a plurality of enclosed spaces 34.

Each of the enclosed spaces 34 is filled with one or more gases selected from He, Ne, Ar, Kr and Xe that is ionized by radiation A, such as X-rays and γ-rays, that passes through the first sensor substrate 31 and the second sensor substrate 32. Thus, a plurality of sensor parts 35 are formed.

In the first sensor substrate 31 and the second sensor substrate 32, a plurality of linear electrodes 38 and 39 made of Ag are formed respectively on radiation-transmissive insulating substrates 36 and 37 made of soda glass in such a manner as to be orthogonal to each other in the enclosed spaces 34 forming the sensor parts 35, and insulator layers 40 and 41 made of a lead-free dielectric material are formed respectively on the insulating substrates 36 and 37 in such a manner as to cover the electrodes 38 and 39. Incidentally, the dielectric material forming the insulator layers 40 and 41 and the formation method can be the same as those of the radiation detector of the present embodiment shown in FIG. 1.

As described above, when measuring radiation using the radiation sensor configured by arranging the plurality of sensor parts 35 two-dimensionally, the respective sensor parts 35 can measure the radiation dose in the same manner as the sensor part shown in FIG. 1 by sequentially applying voltage waveforms to the respective sensor parts 35 at a cycle of the measurement shown in FIG. 4.

Further, by configuring the sensor by arranging the plurality of sensor parts 35 in a matrix two-dimensionally as the radiation detector according to the modification example shown in FIG. 7, it is possible to measure a difference in radiation dose due to a difference in position between the sensor parts 35. Hence, an incident direction of radiation also can be measured.

Further, by adding the radiation doses detected at the plurality of sensor parts 35, it is possible to improve the sensitivity of the radiation detector.

Although, in the above description, the first sensor substrate and the second sensor substrate are the radiation-transmissive insulating substrates made of soda glass, the configuration example of the sensor substrates is not limited to this. For example, a metal substrate on which an insulating material such as glass and resin is formed can be used as the insulating substrate. Further, a metal substrate on which an insulating material such as glass and resin is formed may be used as at least one of the insulating substrates.

As described above, in the radiation detector according to the present embodiment, the radiation sensor is configured by forming the pair of electrodes 8 and 9 and the insulator layers 10 and 11 made of a lead-free dielectric material that respectively cover the pair of electrodes 8 and 9 in the enclosed space 5 filled with a radiation detection gas. Further, the radiation sensor is configured so that: in the radiation detection period, a predetermined voltage is applied between the pair of electrodes 8 and 9, and electric charges accumulate on the insulator layers 10 and 11 by ions and/or electrons generated by ionization of the gas by incident radiation; and in the radiation measurement period, an electric discharge is caused by applying a reverse bias voltage from that applied to the pair of electrodes 8 and 9 in the radiation detection period, and the firing voltage is measured. Hence, by utilizing the amount of electric charge accumulated on the insulator layers in accordance with the radiation dose in the radiation detection period and measuring the voltage reduction at the start of the electric discharge, the radiation dose detected in the radiation detection period can be measured. Therefore, a radiation detector capable of measuring low level radiation with a simple structure can be realized.

INDUSTRIAL APPLICABILITY

As described above, the present invention is a useful invention capable of providing a radiation detector.

The invention claimed is:
1. A radiation detector, comprising:
a housing defining an enclosed space filled with a radiation detection gas;
first and second electrodes opposing each other across the enclosed space;
insulating materials covering entire surfaces of the first and second electrodes facing the enclosed space; and
a voltage source for applying a voltage to the first and second electrodes whereby a radiation sensor is formed,
wherein the radiation sensor is configured so that:
in a radiation detection period, a predetermined voltage is applied between the first and second electrodes, and an electric charge is accumulated on the insulating materials by ions and/or electrons generated by ionization of the gas by incident radiation; and
in a radiation measurement time, an electric discharge is caused by applying a reverse bias voltage from that applied to the first and second electrodes in the radiation detection period, and a firing voltage is measured.

2. The radiation detector according to claim 1, wherein the radiation measurement time is a radiation measurement period having a predetermined time, and
the reverse bias voltage to be applied to the first and second electrodes in the radiation measurement period has a ramp voltage waveform in which the voltage changes with the passage of time.

3. The radiation detector according to claim 1, wherein the first and second electrodes are planar.

4. The radiation detector according to claim 1, wherein the insulating materials are disposed between the first and second electrodes and the enclosed space.

* * * * *